E. V. HARTFORD.
ANTIVIBRATION DEVICE FOR VEHICLES.
APPLICATION FILED OCT. 30, 1909.
1,250,452.
Patented Dec. 18, 1917.
2 SHEETS—SHEET 1.
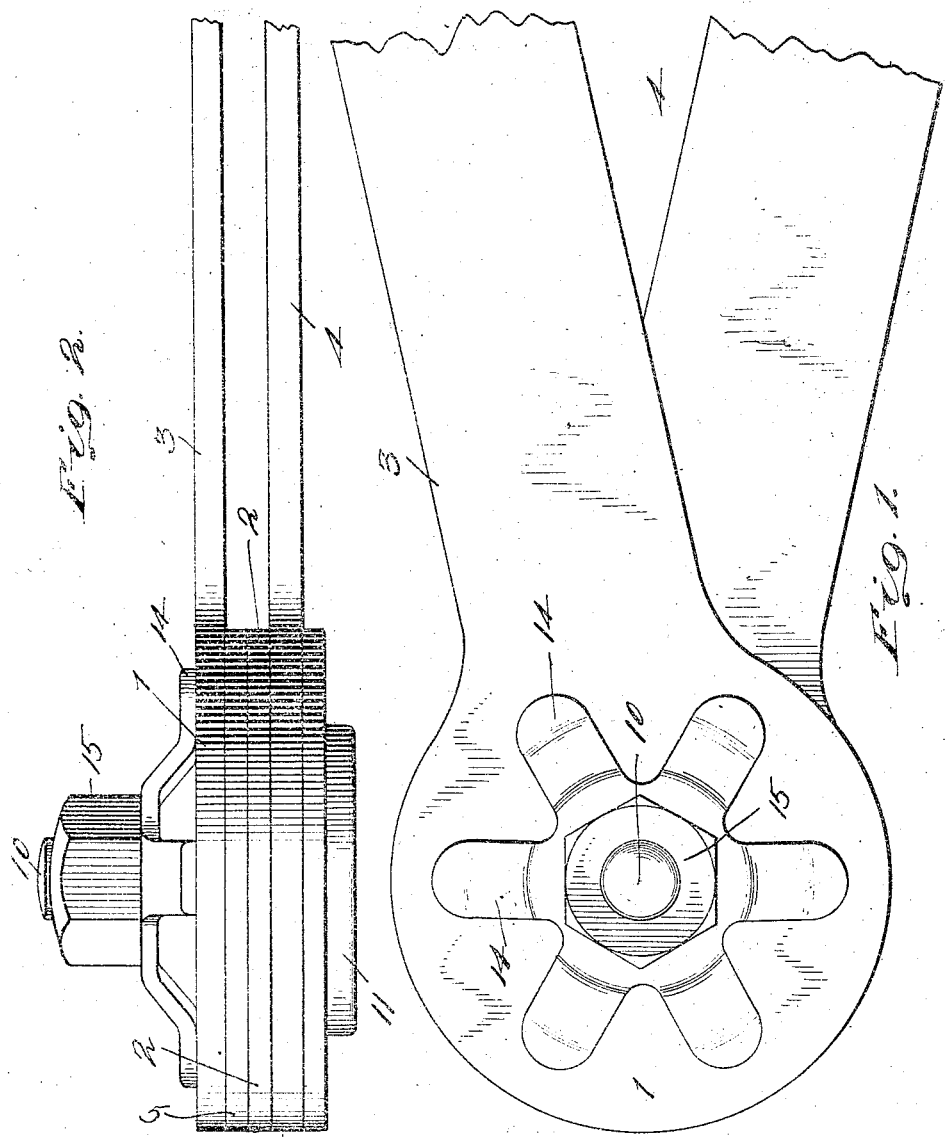

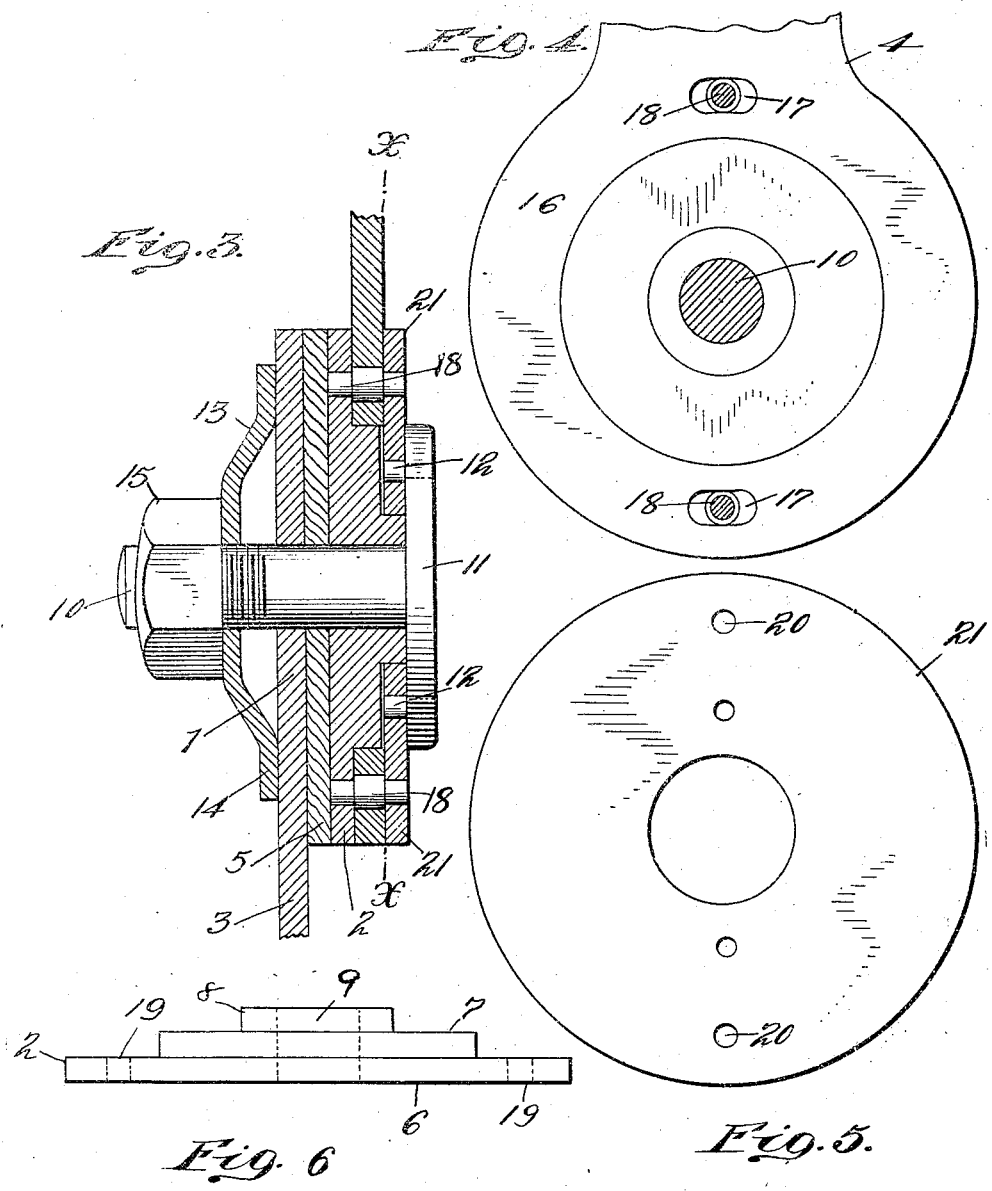

UNITED STATES PATENT OFFICE.

EDWARD V. HARTFORD, OF DEAL, NEW JERSEY.

ANTIVIBRATION DEVICE FOR VEHICLES.

1,250,452.  Specification of Letters Patent.  Patented Dec. 18, 1917.

Application filed October 30, 1909. Serial No. 525,430.

*To all whom it may concern:*

Be it known that I, EDWARD V. HARTFORD, a citizen of the United States, residing at Deal, in the county of Monmouth and State of New Jersey, have invented certain new and useful Improvements in Antivibration Devices for Vehicles, of which the following is a full, clear, and exact specification.

My invention relates to certain new and useful improvements in antivibration devices for vehicles, and the object has been to improve and simplify the construction thereof and to provide a simple and efficient device which will take care of, and prevent to a large extent, the various shocks or vibrations to which the vehicle is subjected in running over imperfect roads.

In the drawings forming part of this application I have illustrated one form of my device, but it will be understood that the invention may be embodied in many forms, and I do not mean to limit myself to the particular one shown. In these drawings—

Figure 1 is a side elevation of the main friction device;

Fig. 2 is a top plan view thereof;

Fig. 3 is a vertical section thereof;

Fig. 4 is a plan view of the annular extension of one of said arms;

Fig. 5 is a plan view of the cover-plate; and

Fig. 6 is a side elevation of one of the friction members.

Like reference numerals indicate corresponding parts in the different figures of the drawings.

In the form illustrated, my invention consists of a primary friction device consisting of two friction members 1 and 2. The friction member 1 is provided with an arm 3, for operating the same, and the member 2 is adapted to be operated by an arm 4. A friction washer 5, of wood, leather, fiber, or other suitable material, is interposed between the main friction members. The outer ends of the operating arms are adapted to be pivotally connected to the respective parts of the vehicle between which the spring is interposed. The pivotal connections are preferably frictionally-retarded and are not here shown, as their construction may be the usual form of such devices well known in the art.

In my preferred form, friction member 1 consists of a circular plate formed integral with the arm 3, as shown, and friction member 2 consists of a disk having a main operating face 6, and annular extensions 7 and 8 of a reduced radius, upon the back thereof. A central aperture 9 is also provided in said member, and similar apertures are likewise provided in the friction washer 5 and friction member 1 and through these perforations passes a bolt 10, having a head 11, which head carries positioning pins 12. An apertured spider-spring 13 also fits upon the bolt. The prongs 14 of which spider spring bear upon the outer face of friction member 1. A nut 15 is provided on said bolt, by means of which the friction members are brought into forcible contact and the pressure therebetween regulated to the desired extent. The arm 4 has formed integral therewith, upon one end thereof, an annular portion 16. Slots 17 are located upon opposite sides of said annular portion. The center of said portion is cut away sufficiently to permit it to fit snugly over the projection 7 on the friction member 2. Pins 18 pass freely through said slots 17 and are held securely in recesses 19 in said member 2 and aperture 20 upon the cover-plate 21.

When the device is assembled as shown in Fig. 3, its operation will be readily understood. The friction members 1 and 2 are pressed firmly together by means of the bolt, coöperating nut and spider-spring. The arm 3 being rigidly connected to the member 1, communicates movement to said member. When the arm 4 is moved slightly, however, it merely communicates movement to the annular extension 16, which is, however, retarded by friction between it and the adjacent faces of the friction member 2 and the plate 21. This slight independent movement, however, is only co-extensive with the length of the slot 17, and any movement beyond causes the pin 18 to contact with one end of said slot and thus a further movement of the arm 4 brings about a movement of the member 2 with respect to member 1.

It is obvious that many modifications and changes may be made in my invention without departing from the spirit thereof, and I do not mean to limit myself to the particular form shown and described, but what I claim and desire to secure by Letters Patent is:

1. The combination of a friction member, an operating arm connected thereto, a second friction member comprising a disk having a friction face coöperative frictionally with the first friction member, and an annular extension of less radius on its rear face and a second annular extension of less radius than the first extension carried rearwardly thereof, an operating arm for the second friction member provided with an annular portion having its face in frictional engagement with the rear face of the said disk and embracing the first annular extension and being of greater thickness than the thickness of the said first extension, an annular plate embracing the second annular extension and having a friction face overlying the annular portion of the second arm, connecting means between the second arm and the disk and annular plate for permitting a limited movement of such arm in respect of the second friction member, and means for bringing the friction faces into frictional relation.

2. A shock absorber comprising a friction member having an operating arm formed integrally therewith, a second friction member coöperating with said first member, said second member comprising a disk having a main operating surface and annular extensions of reduced diameters upon the back thereof, a friction washer interposed between the active surfaces of said friction members, a detachable operating arm for said second friction member, said arm terminating in an annular apertured portion at one end thereof adapted to contact with a corresponding friction surface of one of said extensions on said second member, oppositely-disposed slots formed in said annular portion of said detachable arm, pins carried by said second friction member and adapted to register with said slots whereby said detachable arm will have a limited movement independent of said second member, a cover plate for said second friction member, a bolt axially disposed with respect to all of said members, and a spider spring and nut on said bolt for regulating the pressure between said members.

In witness whereof I have hereunto set my hand in the presence of two subscribing witnesses.

EDWARD V. HARTFORD.

Witnesses:
C. K. POLLITZER,
ADOLPH F. DINSE.